United States Patent [19]

Lamey et al.

[11] Patent Number: 5,063,655

[45] Date of Patent: Nov. 12, 1991

[54] METHOD TO INTEGRATE DRIVE/CONTROL DEVICES AND INK JET ON DEMAND DEVICES IN A SINGLE PRINTHEAD CHIP

[75] Inventors: Patrick Lamey, Manassas; Richard Kachmarik, Bealeton, both of Va.

[73] Assignee: International Business Machines Corp., Armonk, N.Y.

[21] Appl. No.: 672,224

[22] Filed: Mar. 20, 1991

Related U.S. Application Data

[62] Division of Ser. No. 503,353, Apr. 2, 1990.

[51] Int. Cl.[5] ........................ H01C 17/00; B41J 2/05; G01D 15/16

[52] U.S. Cl. .................................... 29/611; 29/890.1; 346/140 R; 437/209; 437/918

[58] Field of Search ............................ 29/890.1, 611; 346/140 R; 437/902, 915, 918, 209; 338/308, 309

[56] References Cited

U.S. PATENT DOCUMENTS 3,949,410 4/1976 Bassous et al. .
3,984,843 10/1976 Kuhn .
4,438,191 3/1984 Cloutier et al. .
4,532,530 7/1985 Hawkins .
4,719,477 1/1988 Hess .

FOREIGN PATENT DOCUMENTS 3443560 11/1983 Fed. Rep. of Germany .
3520704 6/1984 Fed. Rep. of Germany .

OTHER PUBLICATIONS

Hewlett Packard Journal, Entitled "The Second-Generation Thermal Ink Jet Structure", by Askeland et al., Aug. 1988, pp. 28-31.
Hewlett Packard Journal, Entitled "High-Volume Microassembly of Color Thermal Inkjet Printheads and Cartridges", by Boeller et al., Aug. 1988, pp. 32-40.
Hewlett Packard Journal, Entitled "Design and Development of a Color Thermal Inkjet Print Cartridge" by Baker et al., Aug. 1988, pp. 6-15.
Hewlett Packard Journal, Aug. 1988, Entitled "Ink Retention in a Color Thermal Inkjet Pen", pp. 41-44 by Erturk et al.
Hewlett Packard Journal, Aug. 1988, Entitled "Ink and Media Development for the HP Paintjet Printer", pp. 45-50 by Palmer et al.
Hewlett Packard Journal, Aug. 1988, Entitled "Color Thermal Inkjet Printer Electronics" by Hollis et al., pp. 51-56.
Hewlett Packard Journal, Aug. 1988, Entitled "Development of a Color Graphics Printer" by Smith et al., pp. 16-21.
Hewlett Packard Journal, Aug. 1988, Entitled "Mechanical Design of a Color Graphics Printer" by Ta et al., pp. 21-27.

*Primary Examiner*—Carl E. Hall
*Attorney, Agent, or Firm*—Jeffrey S. LaBaw

[57] ABSTRACT

A method to integrate thermal drop on demand ink jet devices and related pulse driver circuitry for chips used in thermal ink jet printers. This integrated printhead chip is made by first fabricating on the substrate the driver pulse circuitry through the last level of metallization. Once complete, a low temperature (<400 C) CVD oxide is deposited and planarized. It is of sufficient thickness (3 to 4 microns) to insure a good thermal barrier between the pulse circuitry and the thermal inkjet devices. After planarization, the resistor material is deposited and patterned. Openings are then patterned to the inputs and outputs of the pulse driver circuitry. Aluminum copper metallurgy is deposited and patterned to connect the resistor to the pulse driver output and define the heater resistor areas. Inorganic and organic barrier layers are applied and patterned to protect the resistor material and interconnecting metallurgy from the corrosive effects of the ink. After testing, ink holes are drilled and the wafer is diced and nozzle plates are attached to the chips. Thus, this "on chip" driver integration enables the pulse driver circuitry to be moved to the thermal ink jet printhead. It offers advantages over other methods of ink jet/driver device integration by the chip footprint the same without decreasing the dimensions of the respective devices.

7 Claims, 4 Drawing Sheets

FIG. 3A(1)
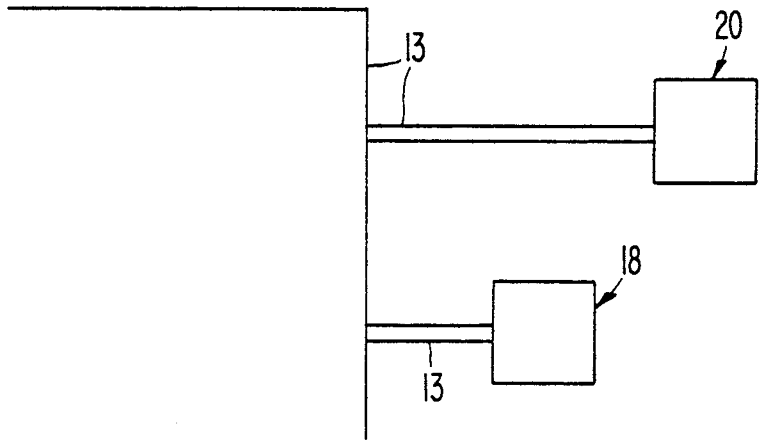
FIG. 3A(2)
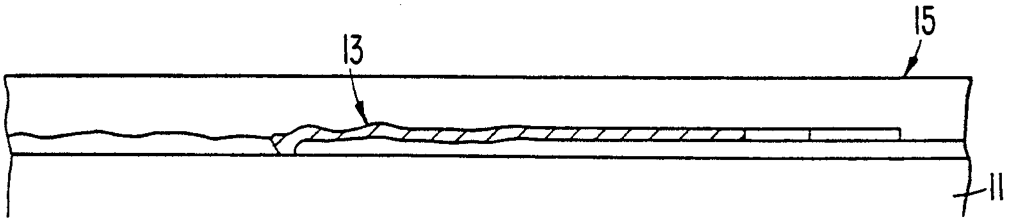
FIG. 3B(1)
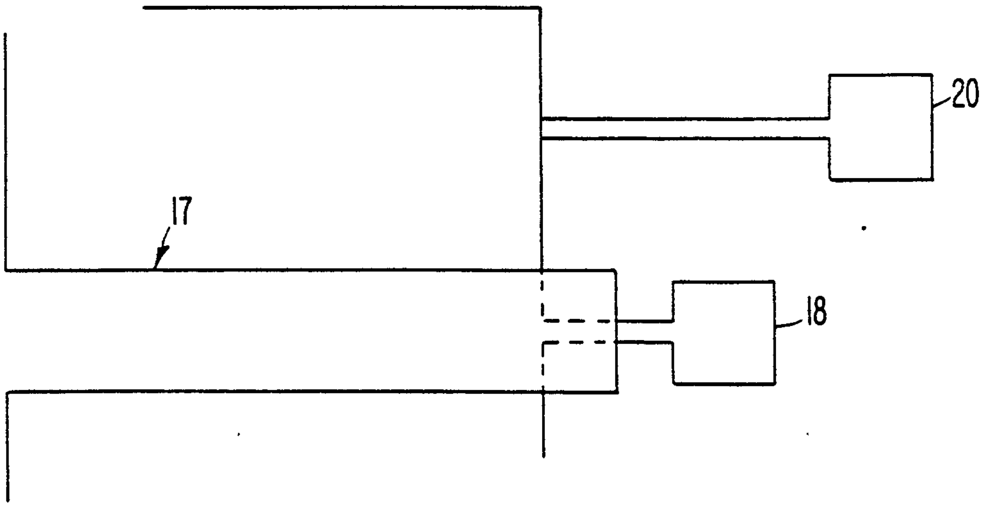
FIG. 3B(2)
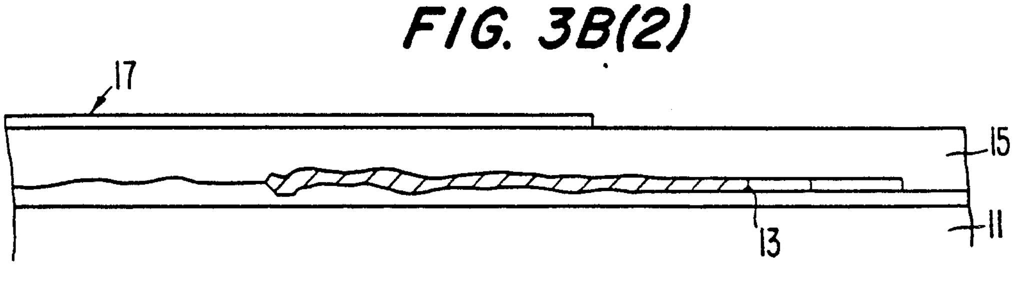

FIG. 3C(1)
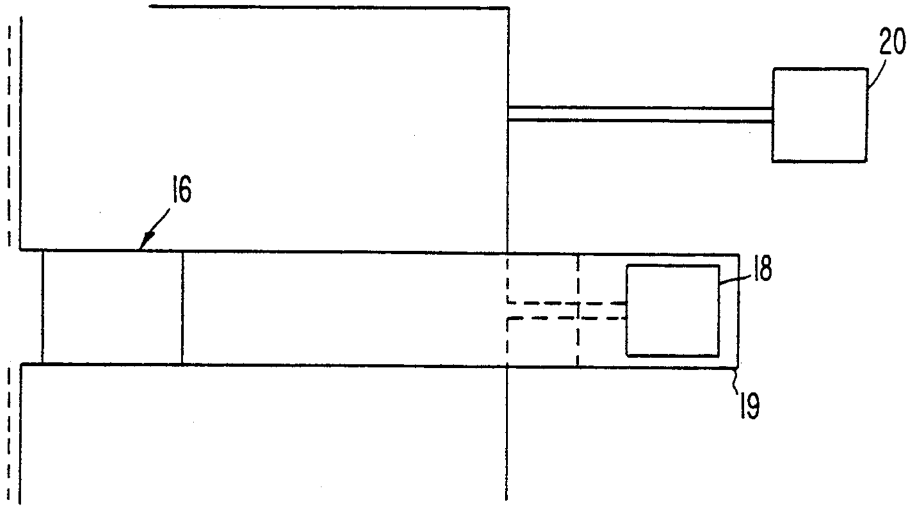
FIG. 3C(2)
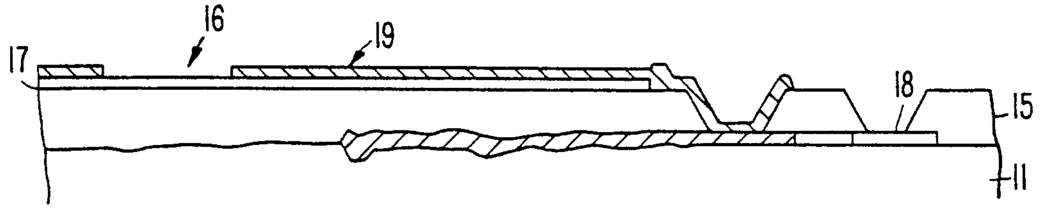
FIG. 3D(1)
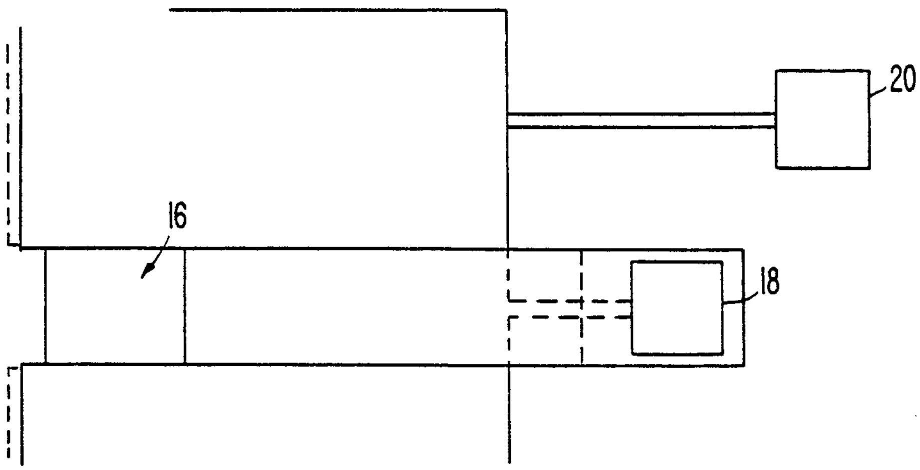
FIG. 3D(2)
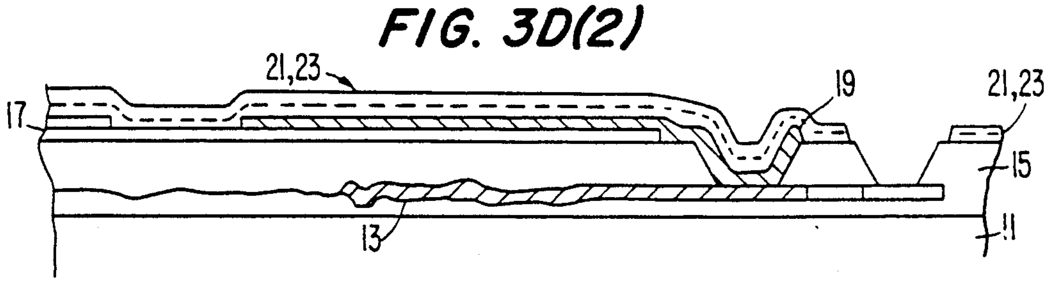

FIG. 3E(1)
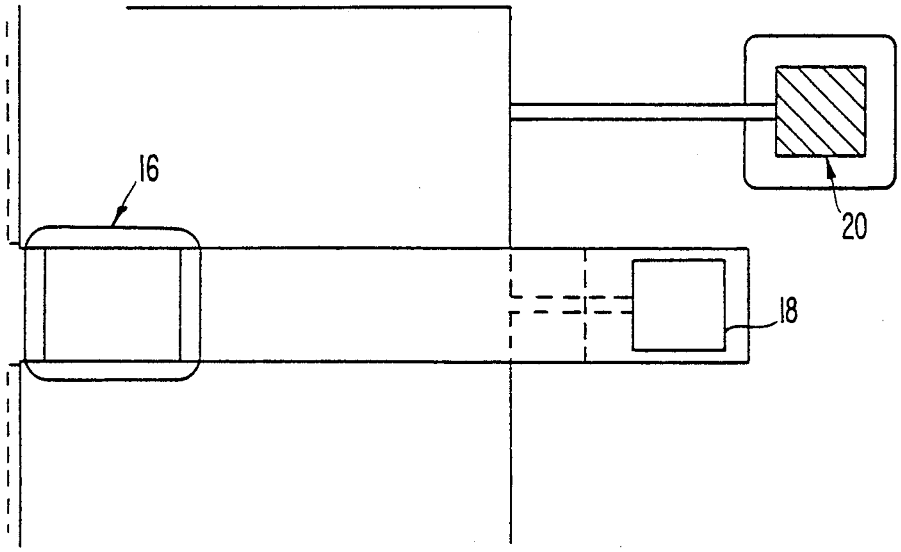
FIG. 3E(2)
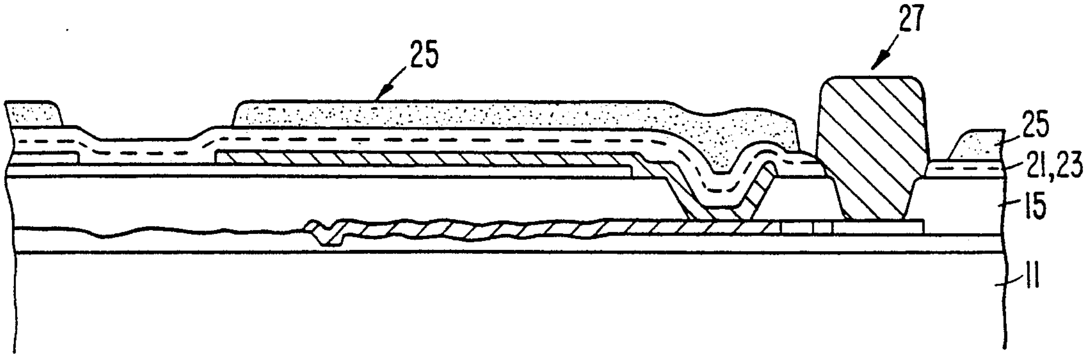

METHOD TO INTEGRATE DRIVE/CONTROL DEVICES AND INK JET ON DEMAND DEVICES IN A SINGLE PRINTHEAD CHIP

This application is a divisional of copending application Ser. No. 503,353, filed Apr. 2, 1990.

BACKGROUND OF THE INVENTION

1. Technical Field

This invention relates generally to thermal ink jet printing and particularly to a novel thermal ink jet printhead and a method to fabricate the printhead by integrating ink jet resistor devices with driver pulse MOS devices on the same chip within the printhead using a unique vertically stacked structure.

2. Background Art

The concepts of thermal ink jet printing have been described in a variety of journals. The Hewlett Packard Journal, in particular, in the May 1985 and the August 1988 editions, provides excellent descriptions of the ink jet printing concepts as well other topics related to manufacture of print heads, color ink jet printer heads, and second generation ink jet chip structures.

FIG. 1 shows a prior art thermal ink jet structure. The ink jet is disposed on a silicon substrate 11 with a thin thermal silicon oxide layer 10.

In the fabrication of a thermal ink jet printhead, the basic thermal ink jet device structure is a heater area 16 consisting of an aluminum or aluminum-copper metal line 19 over a resistor 17 made of a resistive material such as tantalum-aluminum or hafnium diboride. Both the resistor 17 and the metal 19 lines are defined using standard photolithography processes. Deposition of the resistive and metal films can be accomplished using sputtering or, as in the case of the aluminum and copper, evaporation. The aluminum metal lines carry a current pulse across each of the resistors.

Once the resistors 17 and metal lines 19 are defined, it is known to deposit a silicon nitride or silicon carbide film 21 to act as a barrier layer to provide protection for the heater resistor structures from chemical attack by the ink. Typically, the ink is stored in a reservoir behind the ink jet chip and is transported through an access hole to a secondary reservoir area over the barrier layer covering the heater region 16 by gravity and capillary action. Also known is an organic overcoat 25 which further enhances protection for the heater resistors 16 from the ink. These barrier layers 21, 25 are very important because of the corrosive nature of the ink. Therefore, they must be chemically inert and highly impervious to the ink. Once the barrier layers have been deposited, the chip is ready for placement in the printhead. Typically, connection to the other electronic circuitry in the printer is provided using a flex circuit connected to an interconnect pad 29. Among the printer circuitry are the driver pulse circuits which fire the heater resistors.

The primary function of the driver circuitry is to step up the input voltage from the power supply. Typically, these integrated drive circuitry chips contain either a combination of bipolar and MOS devices such as BiMOS II or contain all MOS devices. The BiMOS circuitry can be configured to make bipolar open-collector Darlington outputs, data latches, shift register, and control circuitry.

There is ongoing interest in ink jet printhead fabrication in the continued integration of functions within the printhead. This is driven, as in all cases of electronics integration, by space considerations. If the overall electronics and size of the printer can be reduced, costs of the printer can be reduced. Such integration is alluded to in a number of patents. Hess, in U.S. Pat. No. 4,719,477, outlines a method by which ink jet devices could be interconnected to driver pulse circuitry via a multi-level metallization scheme. Hawkins, in U.S. Pat. No. 4,532,530, using a polysilicon resistor material, mentions simultaneous fabrication of the both the ink jet resistor and interconnection with related MOS circuitry. Along similar lines in U.S. Pat. No. 3,949,410, Bassous et al., describe the ". . . representation of the circuitry for achieving the synchronization signal established integral with the silicon block in accordance with integrated semiconductor circuit processing procedures".

However, none of the schemes presented in the prior art provided for the vertical integration of the pulse driver circuitry with the ink jet resistors. The prior art schemes call for horizontal or lateral methods to integrate functions which greatly increases the chip size, and therefore, cost of fabrication. While one could shrink the dimensions of the MOS driver circuitry to ameliorate the growth in chip size, it is the experience in semiconductor processing that smaller dimensions lead to lower percentage yields, i.e., greater costs.

SUMMARY OF THE INVENTION

It is therefore a primary object of this invention to provide a new and improved thermal ink jet printhead structure and method of its manufacture which vertically integrates printer MOS driver circuitry with the ink jet heater resistors on the same chip.

It is another object of the invention to reduce the cost of fabrication of ink jet printhead printers.

It is yet another object of the invention to keep the chip size of a thermal ink jet printhead structure at a minimum without reducing the dimensions of the printer MOS driver circuitry.

The proposed invention differs from other methods in the art by vertically integrating the metal oxide silicon field effect transistors (MOSFET) driver circuitry and ink jet devices so that both sets of devices are in the same area of the chip, as opposed to lateral integration of the devices where each type of device is in different areas of the chip. Bipolar—metal oxide silicon (BiMOS) circuitry could alternatively be used as the driver circuitry. In the present invention, the two layers of devices are separated by a thermal barrier of silicon oxide. Interconnection between the outputs of the MOS driver circuitry and the ink jet devices is accomplished using a multi-level metallization process. The advantage in vertically stacking the two structures, is that the chip size of the printer head can be kept approximately the same size as prior art structures without reducing the size of the printer MOS circuitry.

In accordance with the method of the present invention, first, the pulse driver circuitry would be fabricated on the silicon substrate. The MOS and/or bipolar circuitry can be fabricated using established semiconductor processing technology. Once the last level of metallization of the driver circuitry is complete, a thermal barrier layer such as a passivation layer of low temperature CVD oxide (<400° C.) is deposited. This passivation layer must be of sufficient thickness (roughly 3–4 microns) to be a good thermal barrier. Once the thermal barrier deposition is complete, the barrier is planarized to provide a planar surface for the fabrication of the ink jet devices. Next, the resistor material is deposited, preferably via sputtering and then patterned using standard photolithography processes. After completion of this step, contact holes are etched into the barrier layer to provide openings to both the inputs and the outputs of the MOS pulse driver circuitry. Next, a conducting material such as aluminum is deposited and photolithographically patterned such that the conducting material contacts both the driver circuitry outputs through the contact holes and defines the heater resistor area. An organic overcoat may also be applied and appropriately patterned to provide openings over the resistor area and to the pulse driver circuitry inputs. Once these steps are complete, standard processes are used to provide a gold tab bump, or other attachment method, to interconnect the MOS driver circuitry inputs to a flex circuit to printer circuitry.

BRIEF DESCRIPTION OF THE DRAWINGS

FIGS. 3A(1) through 3E(2) illustrate the processing sequence used in the manufacture of the structure as shown in FIG. 2, according to a preferred embodiment of the invention.

DETAILED DESCRIPTION OF THE DRAWINGS

The usual substrate for a standard ink jet is a polished silicon wafer on which a thermal oxide is grown. In the present invention, MOS pulse driver circuitry is first fabricated on the silicon substrate before the ink jet devices are fabricated. The pulse driver circuitry is fabricated using standard processes such as those outlined in *VLSI Technology* McGraw—Hill Book Company, 1983 S. M. Sze, editor, a standard text in the semiconductor fabrication art. The basic process steps in building a MOSFET device include such well known processing steps as ion implantation, diffusion and oxidation. The transistors are defined thru the use of polysilicon gates and source/drain regions. Once defined, the devices are interconnected using basic metallization processing.

Figure 1:
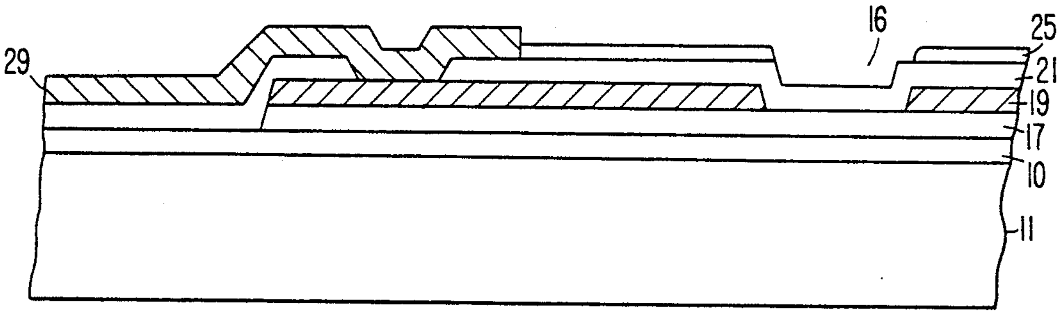
FIG. 1 shows a prior art ink jet structure.
Figure 2A:
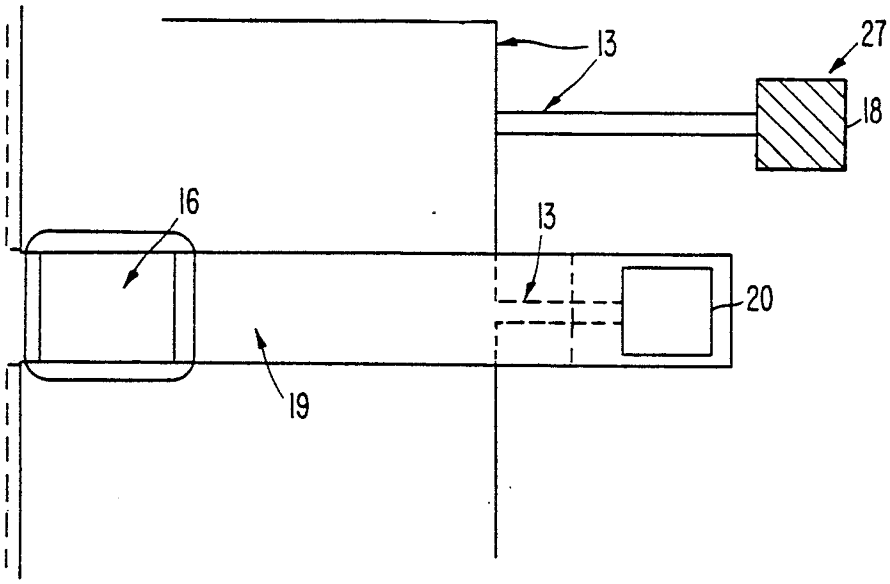
FIG. 2A-2B are a cross section view and top view of the completed vertically integrated structure according to a preferred embodiment of the invention.
Figure 2B:
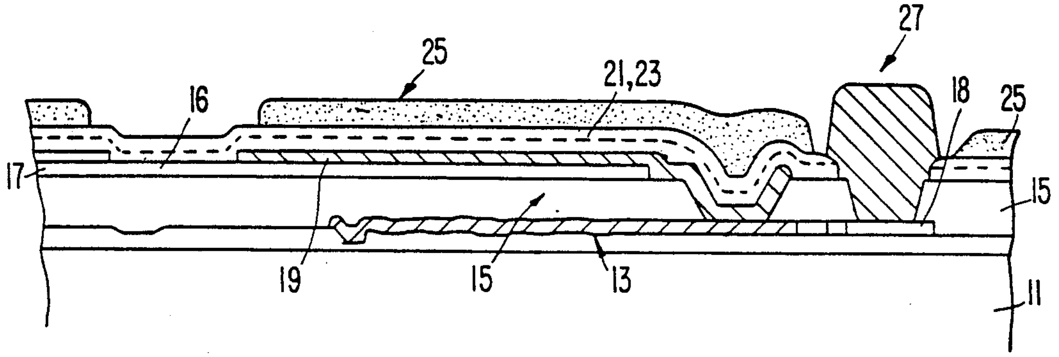

In the discussion which follows with reference to FIG. 2, the ink jet printhead structure is described. Then, by referring to FIGS. 3A through 3E, the various process steps used in fabricating the structure will be described in more detail.

Referring to FIG. 2, the last level of patterned metallization layer 13 of the pulse driver MOS circuitry is depicted on the silicon substrate 11. A thermal barrier layer 15, preferably formed from a low-temperature chemical vapor deposition (CVD) process, is then deposited on the patterned metallization layer 13. This thermal barrier layer 15 is then planarized to provide a flat substrate for the heater elements of the ink jet devices. A resistive material layer 17 is deposited and photolithographically patterned to define heater regions 16. After the resistive material 17 has been patterned, a film of resist is applied, exposed, and developed. Openings into the oxide are then etched using established RIE technology to establish the contact holes for both the interconnection to the outputs of the driver circuitry to the inkjet devices 20 and current inputs to the driver circuitry 18. Conducting layer 19, typically a metal layer such as aluminum, is deposited and photolithographically patterned. The conducting layer 19 not only carries current pulses from the outputs of the driver circuitry layer 13 to the heater regions 17, but also defines the geometry of the heater region 16 as shown in FIG. 2. Next, barrier layers 21 and 23 of silicon nitride and silicon carbide respectively are deposited. An additional organic barrier 25 can be deposited and patterned if so desired. Finally, a gold TAB bump 27 is fabricated to provide inputs via a flex circuit interconnection to the MOS driver circuitry 13.

Referring now to FIGS. 3A through 3E, the various process steps needed to fabricate the structure in FIG. 2 are described in greater detail. In FIG. 3A, the thermal barrier layer 15, preferably composed of low temperature (≦400° C.) CVD silicon oxide is, deposited to a thickness of 5 microns. The choice of CVD oxide is based on the requirements that the film have a low intrinsic stress along with a low dielectric constant. A low temperature CVD oxide can be deposited using tools such as the AME 5000 or a Thermco CVD tube. Using a AME 5000, two different processes are available. First, a thermal oxide is deposited by mixing tetra ethyl oxysilane (TEOS) and ozone ($O_3$) in the chamber at 400° C. Second, a plasma process using TEOS and oxygen will yield a denser oxide at a slightly lower temperature of 330° C. A CVD tube can deposit low temperature oxide (LTO) at 400° C. using silane and oxygen as reactants. Any of these prior art processes could provide the necessary oxide for the thermal barrier. A CVD oxide is preferred due to its low stress and dielectric properties, but could be replaced with other films such as oxynitride, $Al_2O_3$, $Si_3N_4$ or SiC. Other such films should be substituted to the degree that they meet the low temperature deposition (≦400° C.) and provide satisfactory electrical properties. The thermal barrier is an important component of an inkjet chip, regardless of whether or not it is integrated with MOS devices. This thermal barrier should be inert, smooth, low intrinsic stress, and a low thermal conductivity. Its function is to concentrate the heat generated by the inkjet resistor and direct it toward vaporizing the water in the ink. At the same time, it must function as a "thermal gap" to allow low level, long term heat dissipation. In this particular invention, it is particularly important as the underlying MOS devices must be protected from the thermal effects of the inkjet devices. Experimentation has shown that a thickness of 3 to 4 microns of silicon dioxide fulfills these requirements very well. The temperature rise of a typical inkjet is $<60°$ C. during steady state, continuous use. Although silicon dioxide gives excellent results, other materials could be used (such as oxynitride) provided such materials meet the outlined requirements.

The thermal barrier layer 15 is then planarized using techniques well known in the art. Among the possible planarization processes are mechanical or chemical-mechanical polishing, ion beam milling, reactive ion beam assisted etching and reactive ion etching. These planarization processes are well known in the art and vary in process complexity and process tool cost. Chemical-mechanical polishing is the preferred method of planarization because of process simplicity and reduced process tool cost. In chemical-mechanical polishing a mildly abrasive and mildly caustic slurry is prepared and applied to the surface of a substrate. The slurry removes material from the substrate chemically and, with the aid of a conventional wafer polishing tool, mechanically. A discussion of chemical-mechanical polishing can be found in copending patent application Ser. No. 791,860, filed Oct. 28, 1985 entitled "Chemical-Mechanical Polishing Method For Producing Coplanar Metal/Insulator Films On A Substrate" by K. D. Beyer et al., which is hereby incorporated by reference.

In the prior art of printhead manufacture, the planarization of the layer on which the ink jet device is disposed would not be necessary, since the layer itself would lie on the planar semiconductor substrate. However, since the present invention first fabricates MOSFET pulse driver circuitry directly below the ink jet devices, the planarization of the thermal barrier 15 is necessary to assure proper functioning of the heater resistors. Once planarized, the barrier layer 15 provides the starting surface for fabricating the ink jet devices. It is critical that the thermal barrier layer 15 be as planar as possible, as the metal and inorganic overcoats are conformal, they will match the underlying topology. Thus, any nonplanar area will be replicated to form a higher stress region in the inorganic overcoats which could crack and cause inkjet device failure. Where the desired thermal barrier thickness after planarization is 4.0 microns or more, multiple oxide deposition steps each followed by a chemical/mechanical polishing or other planarization processing may be required. Severe topography from the underlying MOSFETs may also contribute to the need for multiple deposition and planarization steps.

The next step in fabrication is the deposition of the resistor layer 17. The preferred material is a 600 angstrom film of hafnium diboride. The other commonly used resistor material in inkjet devices is tantalum aluminide. Hafnium diboride provides superior thermal stability (i.e. electrical characteristics remain more stable) as compared to over tantalum aluminide. Sputter deposition is the preferred method of deposition because it yields the necessary grain and crystal orientation for the required electrical properties. However, if evaporation and CVD techniques can yield films with the required physical and electrical requirements, they can also be used. A layer of photoresist is photopatterned over the resistor layer 17 and the resistor layer 17 is subtractively wet etched to define the heater regions. The deposition of the resistor material 17 has been shown to be a critical step in producing high yield. Excellent deposition thickness uniformity (less than +/−3%) must be maintained to insure good ink jet devices. The results of the processing to this point are shown in FIG. 3B.

Referring to FIG. 3C, once the resistor layer 17 has been patterned, the next step is to open contact holes through the thermal barrier layer 15 at both the inputs 20 and outputs 18 of the MOS driver circuitry metallization layer 13. The contact holes are dry etched using standard reactive ion etching (RIE) techniques for the thermal barrier material 15. The etching of the oxide vias can be accomplished using a variety of reactive ion etch (RIE) tools, e.g., AME 8100 series. In the AME 8100, a gas mixture of 90 SCCM CHF 3 and 8SCCM (standard cubic centimeters per minute) oxygen with a power setting of 1400 watts (−550 V bias) is an effective etching combination. However, care should be used to provide a reasonable slope to facilitate adequate metal coverage by the subsequent conducting layers. Given the large size of the vias and spacing between vias (100 microns by 100 microns and 75 microns spacing), a gradual slope of 75 degrees or less through the 3 to 4 microns of thermal barrier 15 is easily achievable. In addition, given that the conductor metal 19 totally covers the via, any cracking which might occur will still leave an adequate conduction path. This is necessary to prevent large scale metal cracking and electrical discontinuity. The metal cannot effectively "cover" vertical sidewalls. The input pads 20 and output pads 18 are of such size to allow for an adequate amount of via slope. The vias are both sufficiently large and sufficiently far apart (100 um wide and 75 um spacing respectively) to allow for a generous etch bias of approximately 10 um. A large etch bias makes it possible to create gradual slopes through either a reflow technique or by varying gas chemistry during the etch. The photoresist reflow technique uses a photoresist which has been reflowed at a relatively high temperature after development thus creating a more gradual slope, and then transfers the gradual resist slope directly into the underlying film. The use of successive gas chemistries during a RIE etch to create a via with changing slope is another method of creating a good metal coverage. The preferred method is resist reflow, if the vias are sufficiently spaced.

The conducting line layer 19 is preferably fabricated in two layers using two successive lift-off processes. Two layers are generally necessary to create a gradual "staircase" metal slope, although with very gentle contact hole slopes, it is possible to use a single deposition. Slope control is required to prevent subsequent barrier layers 21 and 23 from cracking and creating a void which can occur on a steep metal slope in the via. Although the metal could be patterned by a substrate etch or liftoff technique, the technique is preferred as it gives acceptable metal slopes of 65 degrees or less. First, a liftoff stencil is patterned using conventional photolithography techniques. In a typical lift-off process, two layers of photoresist separated by a etch barrier layer are applied to the wafer. The top photoresist layer is exposed and developed to provide the desired pattern. A dye can be added to the photoresist to minimize reflectivity during photoresist exposure. The etch barrier layer and bottom layer of photoresist are etched using conventional RIE techniques. The metal deposition itself can be either by evaporation or sputtering. The preferred embodiment uses an evaporation deposition process for the metal layers. The first level of conducting metal layer 19 is then deposited over the lift-off stencil to a total thickness of 0.4 um. Preferably, the first level is a serially deposited film consisting of 0.1 um of titanium and 0.3 um of aluminum copper. The resist and excess metal are lifted off using a solvent leaving the desired defined conducting metal layer. The lift-off process is repeated for a second metal layer using a slightly smaller stencil, a 0.1 um layer of titanium and a second 1.1 um layer of aluminum copper. The typical percentage of copper in the aluminum copper alloy is kept at 4% with a 2% tolerance. The resulting structure at this point in the process is shown in FIG. 3C.

Referring to FIG. 3D, the next step is a plasma enhanced chemical vapor deposition (PECVD) of inorganic barrier layers 21 and 23. A dual barrier strategy is important to provide protection to the resistive material 17 and conductor material 19 from the corrosive properties of the ink. By employing a dual barrier layer strategy, pinholes in one film will have a very low probability of directly aligning to a pinhole in the second film, thus making a relatively impervious combined film structure. In the preferred embodiment of the invention, two CVD films are deposited, a silicon nitride layer 21 followed by a silicon carbide layer 23. The films can be deposited sequentially in the same reactor or in separate reactors. The film thicknesses of the inorganic overcoats are 5000 angstroms each for silicon nitride and silicon carbide respectively. An overlap phase region of 1000 angstroms is typically employed when the films are deposited in the same reactor. This means the film thickness composition is 4500 Angstroms nitride, 1000 Angstroms overlap, and 4500 Angstroms carbide. In both cases, the total thickness is 10,000 angstroms. Those skilled in the art would recognize that other barrier layers which possess the necessary corrosion resistance could be used. The barrier layers 21 and 23 are simultaneously patterned to provide openings to the MOS driver circuitry inputs 20 at the driver circuitry metallization layer 13. The vias are etched using a tool such as an AME 8110 or equivalent. A gas combination of 4 SCCM oxygen time of and 40 SCCM CF4 at pressure of 50 mTorr, 750 watts, and 20% past endpoint is employed. The resulting structure is depicted in FIG. 3D.

Referring to FIG. 2E, a second protective layer 25 of an organic materials such as polyimide can be then applied and patterned. Known methods for applying, photopatterning and curing, the polyimide layer 25 are employed. Contact holes are opened in the polyimide layer 25 around the ink jet heater regions 16 and at the MOS driver circuitry inputs 20 located at metallization layer 13. Finally, a gold TAB 27 bump is fabricated at the MOS driver circuitry inputs 20. These provide the interconnection to the flex circuit in the print head. FIG. 3E shows the final result of the process steps.

The preferred method of vertical integration is particularly advantageous for these devices as no high temperature processing (>400° C.) is employed in fabricating the ink jet devices. Therefore, there is no thermal danger to the previously fabricated MOS pulse driver devices used to drive the ink jet structures. Once the printhead has been tested and determined operational, ink holes are drilled, and the wafer diced. Finally, the printhead structures are ready for nozzle plate attachment. The nozzle plate is typically an electroformed metal structure with openings which directly align over the inkjet devices. Typically, alignment targets on the die provide for accurate attachment of the plate to the die. This combined nozzle plate/printhead chip is then tape alignment bonding (TAB) bonded to a flex circuit using standard packaging techniques.

Although a specific embodiment of the invention has been disclosed, it will be understood by those skilled in the art that changes can be made to the specific embodiment without departing from the spirit and scope of the invention.

For example, although the preferred embodiment illustrates the use of MOSFETs for the pulse driver circuitry, it would be obvious to substitute a combination of bipolar and MOS devices. The specific embodiment disclosed is for purposes of illustration only and is not to be taken to limit the scope of the invention narrower than the appended claims.

We claim:

1. A method for fabricating a vertically integrated thermal ink jet printhead wherein at least a portion of a thermal ink jet device is disposed over an pulse driver device on a semiconductor substrate, said method comprising the steps of:
   - providing said pulse driver device on a semiconductor substrate;
   - depositing a thermal barrier layer over said pulse driver device;
   - planarizing said thermal barrier layer;
   - fabricating said thermal ink jet device on said planarized thermal barrier layer over said pulse driver device; and
   - etching contact holes through said thermal barrier layer to allow electrical contact between said pulse driver device and said thermal ink jet device and between said pulse driver device and a circuit which couples said integrated printhead to a thermal ink jet printer.

2. The method as recited in claim 1, wherein the step of fabricating said thermal ink jet device further comprises the steps of:
   - depositing and patterning a resistor material on said planarized thermal barrier layer;
   - depositing and patterning a conducting material which connects said thermal ink jet device with said pulse driver device and defines a heater resistor area on said resistor material;
   - depositing a protective layer to protect said integrated printhead from corrosion; and
   - depositing and patterning an interconnection in said contact hole which provides electrical contact between said pulse driver and said circuit which couples said integrated printhead to said thermal ink jet printer.

3. The method as recited in claim 1, wherein said thermal barrier layer is a CVD silicon oxide layer.

4. The method as recited in claim 2, wherein said resistor material is selected from the group consisting of hafnium diboride, and tantalum aluminide.

5. The method is recited in claim 2, wherein the protective layer comprises a layer of silicon nitride and a layer of silicon carbide.

6. The method as recited in claim 2 wherein a second protective layer is applied and patterned, said second protective layer composed of an organic material.

7. The method as recited in claim 1 wherein all process steps are carried out at temperatures no more than 400 degrees centigrade to prevent thermal damage to said pulse driver device.

* * * * *